United States Patent
Yokoyama et al.

(10) Patent No.: US 7,661,406 B2
(45) Date of Patent: Feb. 16, 2010

(54) INTERNAL COMBUSTION ENGINE FAIL-SAFE CONTROL DEVICE AND METHOD

(75) Inventors: Jin Yokoyama, Hino (JP); Takanobu Aikawa, Fujisawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 443 days.

(21) Appl. No.: 10/574,134

(22) PCT Filed: Dec. 7, 2005

(86) PCT No.: PCT/IB2005/003705

§ 371 (c)(1),
(2), (4) Date: Mar. 30, 2006

(87) PCT Pub. No.: WO2006/061699

PCT Pub. Date: Jun. 15, 2006

(65) Prior Publication Data

US 2008/0249698 A1 Oct. 9, 2008

(30) Foreign Application Priority Data

Dec. 7, 2004 (JP) .............................. 2004-353476

(51) Int. Cl.
*F02D 11/10* (2006.01)
*F02D 11/00* (2006.01)
(52) U.S. Cl. .................. 123/399; 123/339.15
(58) Field of Classification Search ............ 123/399, 123/339.15, 376, 377, 337, 395; 73/116.04; 701/114

See application file for complete search history.

(56) References Cited

U.S. PATENT DOCUMENTS

| 4,779,597 | A | * | 10/1988 | Takaku et al. | ............... 123/479 |
| 5,092,298 | A | | 3/1992 | Suzuki et al. | |
| 5,343,840 | A | * | 9/1994 | Wataya et al. | ............... 123/399 |
| 5,601,063 | A | * | 2/1997 | Ohashi et al. | ............... 123/396 |
| 6,009,853 | A | | 1/2000 | Fujikawa et al. | |
| 6,173,697 | B1 | * | 1/2001 | Goto | .......................... 123/396 |

(Continued)

FOREIGN PATENT DOCUMENTS

EP    0 276 003    7/1988

(Continued)

OTHER PUBLICATIONS

Japanese P/N 02286837 (Murata et al.) Nov. 27, 1990 (translation).*

*Primary Examiner*—Mahmoud Gimie
(74) *Attorney, Agent, or Firm*—Global IP Counselors, LLP (57) ABSTRACT

To prevent an increase in torque when the fixed state of a throttle valve is released. When diagnostics reads fixed diagnostics flag 1 indicating that the throttle valve is in a fixed state, control value ATVO that can maintain throttle aperture RTVO is set (S11, S12) based on detected value RTVO for the throttle aperture in the current fixed state, fuel injection volume TiO that is calculated according to new air volume Q is secured at fuel injection volume TiL or greater in order to achieve the engine torque for when fail-safe control is executed, and when air-fuel ratio $\lambda$ is less than the lower limit value $\lambda L$, causing an increase in the amount of smoke, control is executed to suppress the occurrence of said smoke.

13 Claims, 5 Drawing Sheets

U.S. PATENT DOCUMENTS

| | | | |
|---|---|---|---|
| 6,209,518 B1 * | 4/2001 | Machida et al. | 123/396 |
| 6,584,392 B1 | 6/2003 | Jankovic et al. | |
| 7,114,487 B2 * | 10/2006 | Hedrick et al. | 123/399 |
| 2001/0039938 A1 * | 11/2001 | Machida et al. | 123/396 |
| 2002/0193935 A1 | 12/2002 | Hashimoto et al. | |
| 2004/0035391 A1 * | 2/2004 | Fuwa | 123/396 |

FOREIGN PATENT DOCUMENTS

| | | |
|---|---|---|
| JP | H02-286837 | 11/1990 |
| JP | H07-083029 | 3/1995 |
| JP | H10-121998 | 5/1998 |
| JP | 2004-239136 | 8/2004 |

* cited by examiner

INTERNAL COMBUSTION ENGINE FAIL-SAFE CONTROL DEVICE AND METHOD

CROSS-REFERENCE TO RELATED APPLICATIONS

The present application claims priority under 35 U.S.C. §119 of Japanese Application No. 2004-353476, filed on Dec. 7, 2004, the entire content of which is expressly incorporated by reference herein.

FIELD

The present invention pertains to fail-safe control technology for a throttle valve inserted in an intake system for an internal combustion engine that becomes stuck in freezing conditions, or the like.

BACKGROUND

In recent years, internal combustion engines, particularly diesel engines, are equipped with an exhaust micron particle collecting device (or a Diesel Particulate Filter, hereinafter referred to as DPF) for collecting exhaust micron particles (or particulate matter, hereinafter referred to as PM), and when the PM collected in the DPF reaches a prescribed amount, it raises the exhaust temperature, burns off the collected PM and regenerates the DPF. When said DPF regeneration is performed, the throttle valve is control-pressed to cause pump loss and decrease the amount of air intake, while increasing the amount of fuel injection and raising the exhaust temperature.

However, for internal combustion engines in vehicles, since blow-by gas containing water vapor is returned to the portion that is upstream of the throttle valve, this blow-by gas freezes in cold climates where outdoor temperatures are low so that when the water vapor gets in the shaft of the throttle valve, it freezes and gets stuck. Foreign matter can also clog the throttle valve and cause it to get stuck.

When the diagnostics shows that it has become fixed, the throttle control is intercepted and the amount of fuel injection is increased to become more than the amount injected during normal control in order to ensure the minimum torque and prevent the engine from stopping. (see Unexamined Japanese Patent Application Publication No. 2000-345899.)

SUMMARY

The throttle valve is forced in the open direction using a default spring so that it remains open under the condition in which DPF regeneration is not performed, so when it thaws and is released from its fixed state, the throttle valve opens up all the way and the volume of new air increases, causing the volume of fuel injection to increase together with an increase in the torque, resulting in an uncomfortable sensation for the driver.

Therefore, one aspect of the present invention is configured so that when diagnostics shows that the throttle valve is in a fixed state, the throttle aperture is controlled to maintain the aperture with said throttle valve in the fixed state and fail-safe control is performed to ensure the prescribed torque.

DETAILED DESCRIPTION

An explanation of an embodiment of the present invention is provided below with reference to the drawings.

Figure 1:
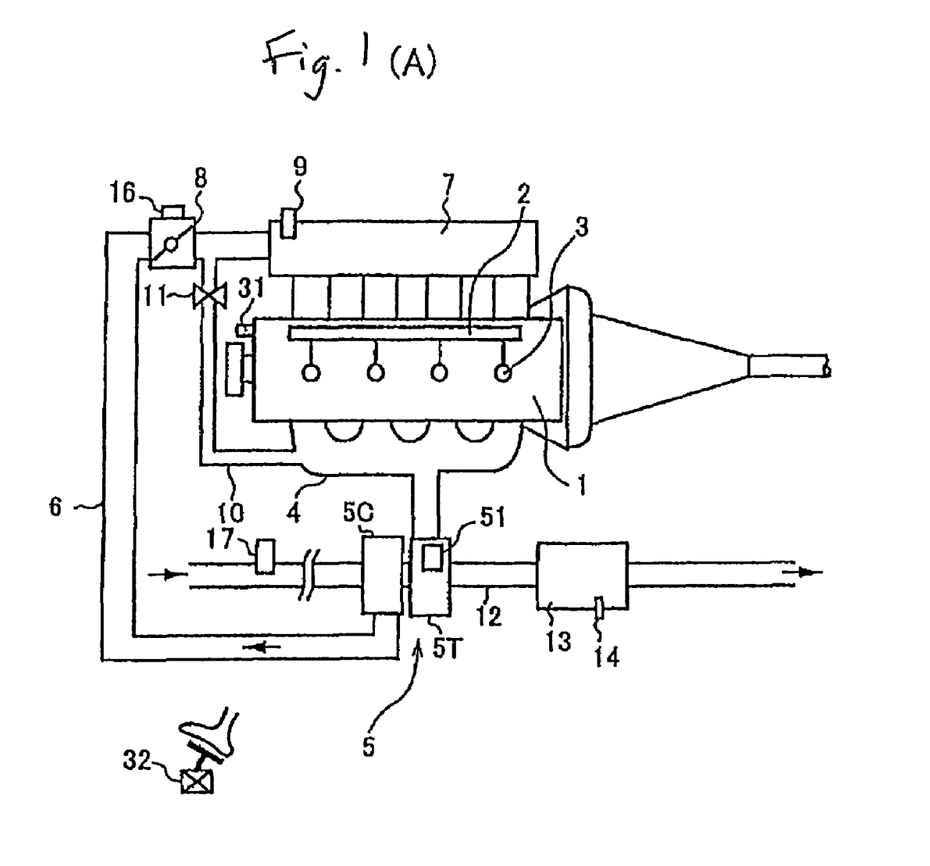
FIG. 1(a) is a drawing showing the system configuration for an embodiment of the present invention.
FIG. 1(b) is a drawing showing a schematic configuration of an engine control unit (ECU) according to an embodiment of the present invention.

In FIG. 1, the fuel injection system for engine 1 (an internal combustion engine, such as a diesel engine) is a common rail type fuel injection system and comprises common rail 2, injector 3 that turns the fuel injection ON and OFF using an electromagnetic valve and a supply pump, not shown in the drawing.

Downstream of exhaust manifold 4 is turbine 5T for turbo supercharger 5 and on top of the same axis as that of said turbine 5T, is attached compressor 5C. The intake is first compressor-pressed by compressor 5C, passes through intake pathway 6 and is inhaled inside the cylinders of engine 1 via collector 7. Throttle valve 8 is attached along intake pathway 6 in order to restrict the amount of intake. Said turbo supercharger 5 is a variable capacity type so that when the variable nozzle (VNT) on actuator 51, which is provided on the same side as turbine 5T, is closed, the turbine efficiency and supercharge pressure increase and when the variable nozzle is opened, the turbine efficiency and supercharge pressure decrease. In addition, provided on collector 7 is supercharge pressure sensor 9 for detecting the supercharge pressure (intake pressure).

Said exhaust manifold 4 and intake pathway 6 are connected via EGR pathway 10. The EGR gas volume is controlled by the aperture of EGR valve 11, which is inserted into said EGR pathway 10. Attached to exhaust pathway 12, which is located downstream of turbine 5T, is DPF 13 for collecting the PM and attached to this is DPF temperature sensor 14 for detecting the temperature of said DPF 13. Input to engine control unit 15 is the engine rotating speed signal detected by rotating speed sensor 31, the accelerator aperture signal detected by accelerator aperture sensor 32, the DPF temperature signal detected by DPF temperature sensor 14 and the supercharge pressure signal detected by supercharge pressure sensor 9 and based on each of these signals, an operation command signal is output to injector 3, throttle valve 8, EGR valve 11 and actuator 51.

When DPF regeneration is performed, the aperture of throttle valve 8 is controlled to cause a pump loss and decrease the amount of air intake while increasing the amount of fuel injection and raising the exhaust temperature in order to burn off the PM collected in DPF 13. In addition, throttle sensor 16 is provided for detecting the aperture of throttle valve 8 and based on the throttle aperture detected, the fixed state of throttle valve 8 is diagnosed, and when the diagnostics indicate that it is in a fixed state, the aperture of throttle valve 8 is held at a fixed aperture while switching to fail-safe control to ensure at least the prescribed torque. Also provided is air flow meter 17, which detects the amount of air intake and performs control by calculating the air-fuel ratio based on the amount of air intake and fuel injection that occurs when the fail-safe control is performed in order to suppress the occurrence of smoke.

For more background information, regeneration of a DPF such as DPF 13 is described in greater detail in U.S. Pat. No. 6,851,258, commonly owned by the assignee of the present application, and which is hereby incorporated by reference in its entirety herein. Such a regeneration method, among others, may be used with embodiments of the present invention.

Figure 2:
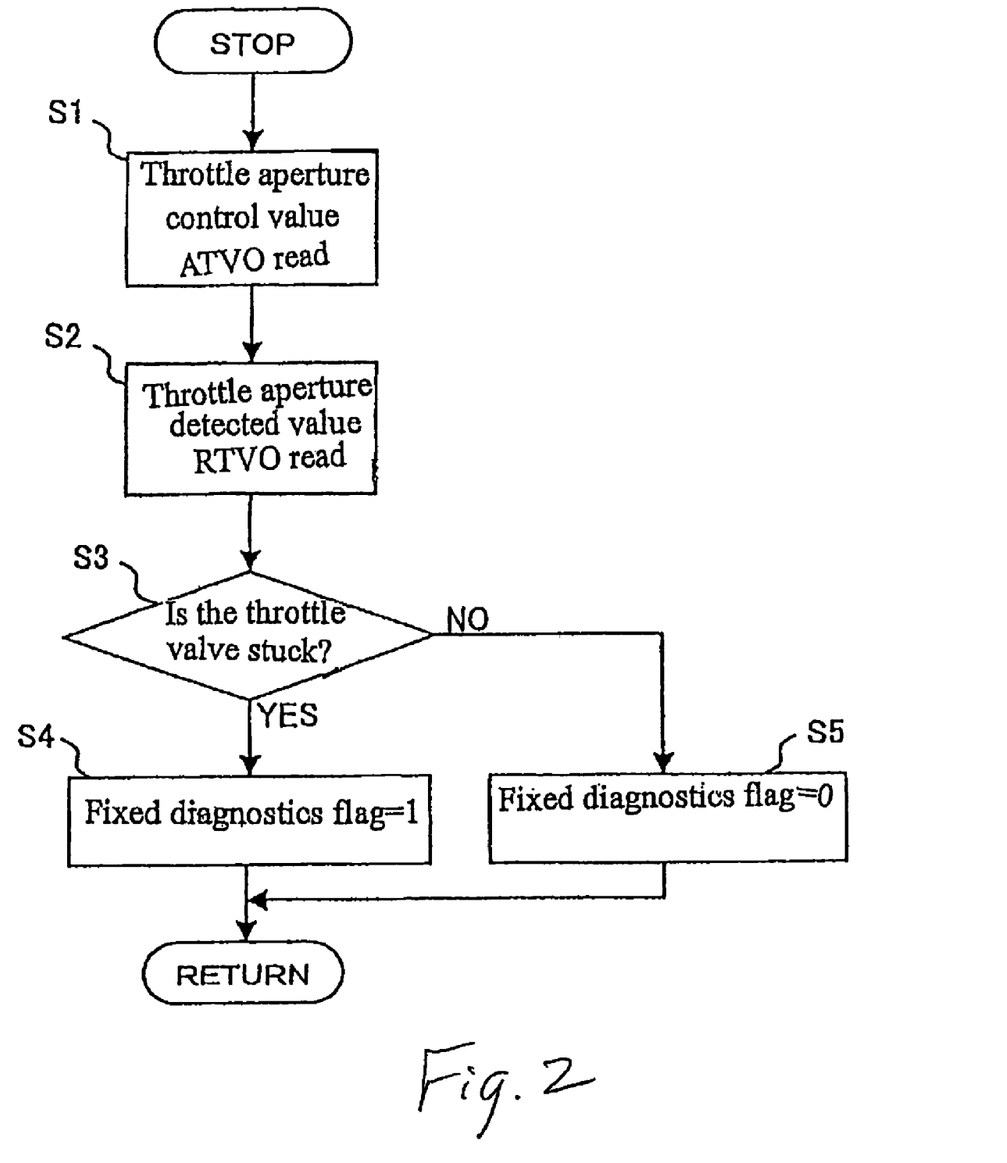
FIG. 2 is a flowchart showing the fixed diagnostics routine for the throttle valve for the aforementioned embodiment.

FIG. 2 is a flowchart showing the routine for diagnosing the fixed state of throttle valve 8. In Step 1 (step is abbreviated in the drawing as "S" and the same is true for the drawings described below), the control value for the current throttle aperture (ATVO) is read. In Step 2, the real throttle aperture (RTVO) detected by throttle sensor 16 is read.

In Step 3, the absolute value of the difference (ATVO–RTVO) between the control value for said throttle aperture ATVO and real throttle aperture RTVO is compared to the threshold value in order to determine whether or not throttle valve 8 is stuck. At Step 3, if it is determined that ATVO–RTVO is more than the threshold value, then throttle valve 8 cannot be controlled. In other words, throttle valve 8 is diagnosed as being stuck, the process proceeds to Step 4 and a fixed diagnostics flag is set as "1" to indicate the fixed state.

On the other hand, at Step 3, if it is determined that ATVO–RTVO is less than a threshold value, diagnostics will indicate that throttle valve 8 is not fixed and can therefore be controlled and a fixed diagnostics flag is reset to "0" to indicate the normal state.

Figure 3:
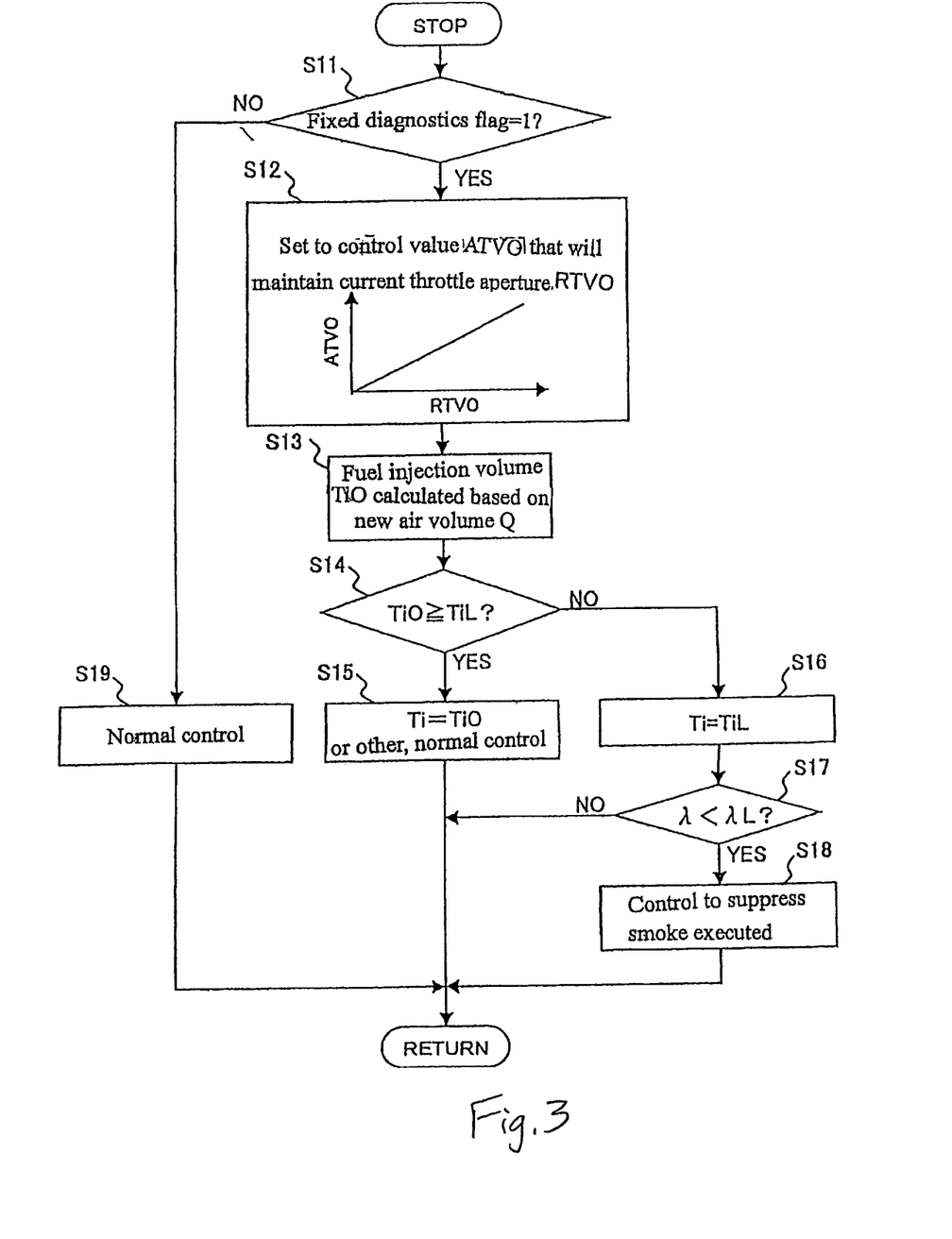
FIG. 3 is a flowchart showing the recovery routine based on the fixed diagnostics result for the same embodiment.

In Step 11, it is determined whether or not the throttle valve is fixed based on the value of said fixed diagnostics flag. When it is determined at Step 11 that throttle valve 8 is not stuck, the process proceeds to Step 18 and a control value that indicates the normal state is set for throttle 8 and the other parts and normal control is performed. Normal control includes DPF regeneration control.

On the other hand, referring to FIG. 3, if it is determined at Step 11 that throttle valve 8 is stuck, the process proceeds to Step 12 and on and the prescribed fail-safe control is executed. In this case, if throttle valve 8 is diagnosed as stuck while DPF regeneration control is being performed, said DPF regeneration control is prohibited and the process switches to fail-safe control. In other words, for DPF regeneration control, throttle valve 8 is closed-controlled so that it reaches the target air-fuel ratio that has been set to burn off the PM at the appropriate speed in accordance with the amount of accumulated PM while performing injection timing delay control to raise the exhaust temperature. However, when the throttle valve is stuck, it cannot be controlled to obtain the proper aperture and it becomes difficult to ensure the necessary torque, so DPF regeneration is prohibited.

First at Step 12, a search is made for a map to set the control value for the throttle aperture that will maintain throttle aperture RTVO based on throttle aperture RTVO in the fixed state that is currently detected. Thus, the throttle aperture is maintained in the current fixed state. Next, at Step 13, the same conditions are set for when normal control is performed based on the volume of intake air (volume of new air) Q, detected by aforementioned air flow meter 17 and the amount of fuel injection TiO is calculated.

At Step 14, it is determined whether the fuel injection volume is at lower limit fuel injection volume TiL, which generates minimum torque or a level at which said fuel injection volume TiO will not cause the engine to stop, thus allowing the driver to drive to the dealer.

At Step 14, when said amount of fuel injection TiO is determined to be more than TiL, the process proceeds to Step 15, said fuel injection volume TiO is controlled, as is, to be the final set value and EGR control such as the injection timing, etc., is set in the same manner as when normal control is performed.

At Step 14, if said amount of fuel injection TiO is determined to be less than TiL, the process proceeds to Step 16 and the fuel injection volume is set to lower limit value TiL. Thus, the minimum torque can be ensured, but the relative air intake volume Q is insufficient, so the air-fuel ratio is a rich mixture. Therefore, at Step 17, air-fuel ratio $\lambda$ is calculated based on the current air intake volume Q that is detected as the set fuel injection volume TiL and said calculated air-fuel ratio $\lambda$ is compared with lower limit value $\lambda L$ that can tolerate smoke. Simply put, the fuel injection volume is increased by adding a prescribed amount of fuel in relation to fuel injection volume TiO that was set in the same manner as when normal control is performed in order to ensure the minimum torque and air-fuel ratio $\lambda$ that is calculated in relation to this added amount of fuel injection is compared with lower limit value $\lambda L$ to make the determination.

If the calculated air-fuel ratio $\lambda$ is less than said lower limit value $\lambda L$ that can tolerate smoke, or if it is a rich mixture and it is controlled, as is, the occurrence of smoke increases, so the process proceeds to Step 18 and the process switches from normal control to a control that suppresses the smoke. More specifically, said control to suppress the smoke switches to a fuel injection timing map that suppresses smoke in order to set the fuel injection timing to the delayed side by comparing fuel injection timing IT, which is set in accordance with engine rotation speed Ne and fuel injection volume Ti (engine load), with the fuel injection volume used during normal control. Thus, by delaying the fuel injection timing, combustion takes place when the internal cylinder temperature that is delayed from the top dead center is comparatively low, so the occurrence of smoke can be favorably suppressed.

In addition, compared to normal divided fuel injection control, the control method in which fuel injection is divided into reserve fuel injection and main fuel injection switches to the fuel injection timing map for suppressing smoke in order to control the injection timing for reserve fuel injection to the advance side and the injection timing for the main fuel injection to the delayed side. In doing so, the reserve fuel injection in which a small amount of fuel is injected advances, which increases the vaporization time for the fuel, thus promoting vaporization and the main fuel injection in which a large amount of fuel is injected is delayed until after the reserve fuel injection takes place, thus increasing the time interval, lengthening the time allowed for the fuel and air to mix and promoting vaporization while combusting at a low temperature in order to allow for favorable suppression of the occurrence of smoke.

Also, compared to normal divided fuel injection control, the same control method in which fuel injection is divided into reserve fuel injection and main fuel injection switches to the fuel injection timing map for suppressing smoke so that the reserve fuel injection volume is reduced or set at "0". In doing so, the main fuel injection has a sufficient air-to-fuel mixture and vaporization is promoted so the occurrence of smoke can be favorably suppressed. In this method, the same fuel injection timing control for suppressing smoke can be used for both the reserve fuel injection and main fuel injection.

Also, compared to normal control, EGR control switches to an EGR rate map for suppressing smoke in order to reduce the EGR rate or make it "0". Since increasing the inert EGR gas generates more smoke, reducing the EGR rate or making it "0" will allow for favorable suppression of the smoke. It is desirable to perform EGR control in conjunction with the aforementioned fuel injection control.

When the prescribed conditions are achieved while executing the fail-safe control, as described above, the diagnostics determines whether throttle valve 8 is fixed, has been released or has been recovered to an operable state. In the case of a fixed state other than one which is due to a breakdown and requires repair, such as a frozen throttle valve, recovery can be achieved by raising the temperature to release the throttle valve from the frozen state and for a fixed state caused by foreign matter clogging the valve, vibration can be used to remove the foreign matter and recover the throttle valve to an operable state so recovery diagnostics can be performed and when recovery is achieved, the process promptly switches to normal control (including DPF regeneration).

Figure 4:
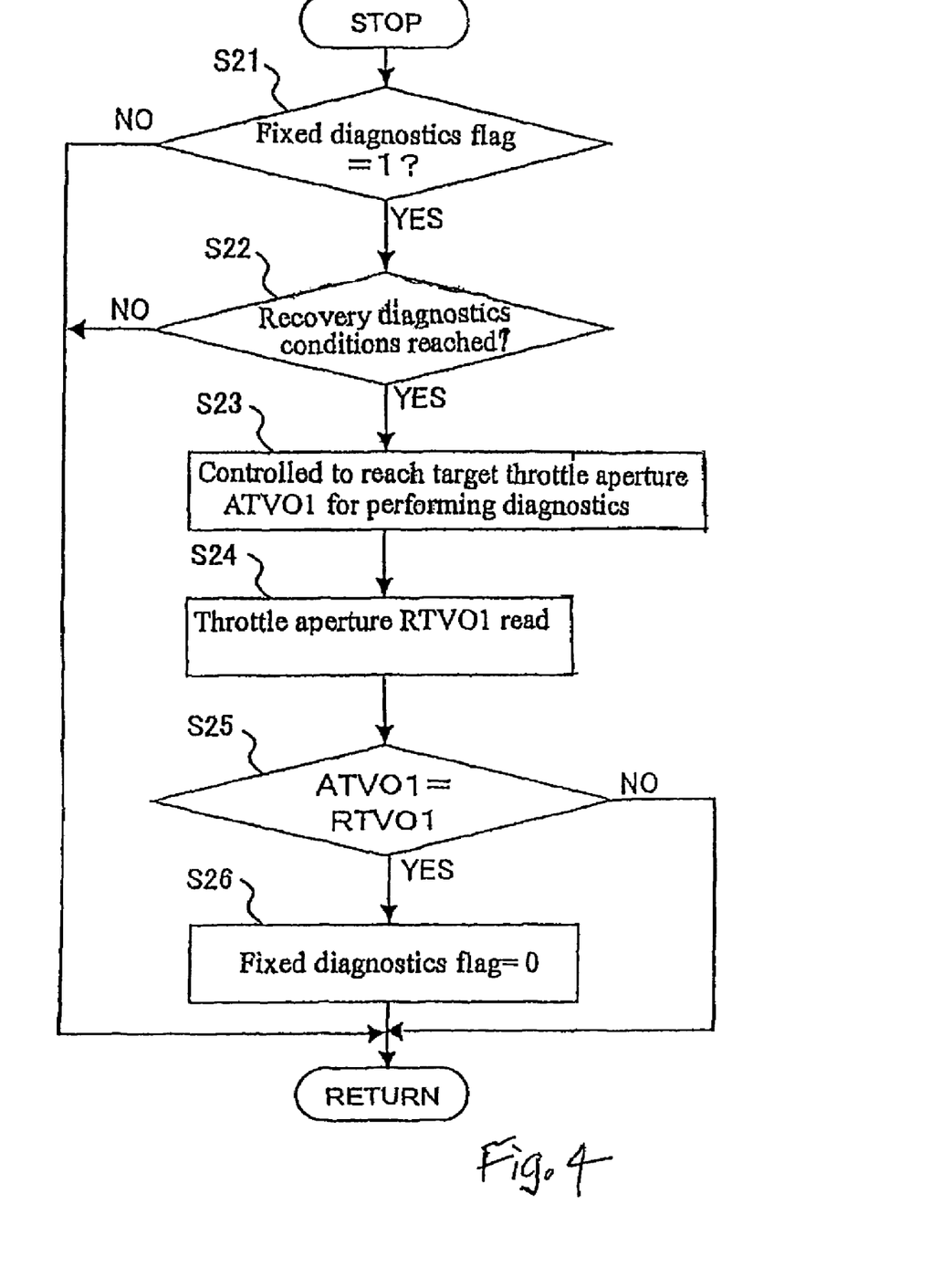
FIG. 4 is a flowchart showing the throttle valve recovery diagnostics routine for the same embodiment.

FIG. 4 is a flowchart showing the aforementioned recovery diagnostics routine for throttle valve 8. In Step 21 it is determined whether or not the valve is fixed based on the value for the aforementioned fixed diagnostics flag. If it is determined that the valve is fixed, the process proceeds to Step 22 and it is then determined whether or not the recovery diagnostics conditions have been reached. Specifically, when one of the following conditions has been met, the process determines that recovery diagnostics conditions have been reached.

a. Deceleration

This recovery diagnostics controls throttle valve 8 in the open direction and then determines whether it will operate at the target aperture so that when deceleration takes place, the fuel supply is either cut or only a small amount of fuel is injected and when recovery is achieved, even if the throttle aperture increases this will not cause the torque to increase (when the fuel supply is cut) or can suppress it to a minimum (when only a small amount of fuel is injected) so recovery diagnostics is performed. Deceleration is determined when the accelerator aperture is at a prescribed value or less or when the brakes are operated, etc.

b. Acceleration

Since acceleration is done at the discretion of the driver, even if the torque increases after recovery, this will not cause a problem so diagnostics can be performed. Acceleration is determined when the rate of change in the increase of the accelerator aperture is at a prescribed value or more.

c. When under DPF regeneration control conditions and DPF regeneration control is prohibited after the allowed setting time has expired, since DPF regeneration control does not need to rush to perform a complete regeneration, it performs setting time regeneration control, then prohibits regeneration control and performs regular recovery diagnostics. After diagnostics is performed and the DPF regeneration control conditions are reached again, recovery control can be continued.

Only one of the aforementioned conditions needs to be met in order for a determination to be made. When one of the aforementioned recovery diagnostics conditions is met, the process proceeds to Step 23 and recovery diagnostics is executed. At Step 23, target throttle aperture ATVO1 for performing diagnostics is set to control (output a drive signal) throttle valve 8 so that it reaches said target throttle aperture ATVO1. Said target throttle aperture ATVO1 for performing diagnostics can be set to a fixed value for a prescribed aperture or more, or can also be set at an aperture with a prescribed amount of increase over the aperture detected during the fixed state.

At Step 24, throttle sensor 16 detects throttle aperture RTVO1 after the aforementioned throttle control has been performed and reads it. At Step 25, it is determined whether said target throttle aperture ATVO1 and real throttle aperture RTVO1 coincide with one another within the permissible error range and when it is determined that they coincide, the process proceeds to Step 26, diagnostics determines that the fixed state of throttle valve 8 has been released and that it can be controlled and the aforementioned fixed diagnostics flag is reset to "0". Thus, the process switches from fail-safe control performed according to the determination made in said Step 11, to normal control (including DPF regeneration control.

On the other hand, when said apertures do not coincide within the permissible error range, the process flow ends. When this takes place, the value for the fixed diagnostics flag is held at "1", so fail-safe control can be continued.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A fail-safe control method for an internal combustion engine comprising:
 determining when a throttle valve in an intake system of the internal combustion engine is stuck in a fixed position;
 controlling a throttle aperture to maintain the throttle valve aperture in the fixed position and to increase the throttle valve aperture of the throttle valve when an amount of fuel injection is less than a prescribed amount, including zero;
 operating a fail-safe control to ensure a prescribed torque in the engine; and
 performing recovery diagnostics while fail-safe control is being performed to determine whether the fixed state of the throttle valve has been released.

2. A fail-safe control method for an internal combustion engine, comprising:
 determining when a throttle valve in an intake system of the internal combustion engine is stuck in a fixed position;
 controlling a throttle valve aperture to maintain the throttle valve aperture in the fixed position;
 operating a fail-safe control to ensure a prescribed torque in the engine, by increasing an amount of fuel injection beyond the amount of fuel injection set when normal control of air intake volume is performed when maintaining the throttle valve aperture in the fixed state.

3. The fail-safe control method of claim 2, wherein
 the operating of the fail-safe control further includes suppressing an occurrence of smoke when an air-fuel ratio is less than a prescribed mixture, or is a rich mixture, when the amount of fuel injection has been increased.

4. The fail-safe control method for an internal combustion engine described in claim 3, wherein
 the suppressing of the occurrence of smoke includes delaying a fuel injection timing more than when normal control is performed.

5. The fail-safe control method of claim 3, wherein
 the suppressing of the occurrence of smoke includes dividing the fuel injection during a combustion cycle into a reserve fuel injection and a main fuel injection so that a reserve fuel injection timing is advanced and a main fuel injection timing is delayed as compared to when normal control is performed.

6. The fail-safe control method of claim 3, wherein
 the suppressing of the occurrence of smoke includes dividing the fuel injection during a combustion cycle into a reserve fuel injection and a main fuel injection so that a volume of the reserve fuel injection is reduced or eliminated as compared to during normal control.

7. The fail-safe control method of claim 3, wherein the suppressing of the occurrence of smoke includes reducing or stopping an EGR rate.

8. A fail-safe control method for an internal combustion engine, comprising:

determining when a throttle valve in an intake system of the internal combustion engine is stuck in a fixed position;

controlling a throttle valve aperture to maintain the throttle valve aperture in the fixed position; and operating a fail-safe control to ensure a prescribed torque in the engine in which the fail-safe control includes preventing a regeneration control of an exhaust micron particle collecting device in an exhaust system from regenerating when the throttle valve is determined to be stuck in the fixed position and switching to the fail-safe control.

9. A fail-safe control device for an internal combustion engine, comprising:

a throttle valve;

a diagnostic for determining a position of the throttle valve; and a control unit for controlling a throttle valve aperture when the throttle valve is stuck in a fixed position by maintaining the throttle valve aperture in the fixed position, the control unit further performing a control for suppressing an occurrence of smoke by delaying a start of a fuel injection timing more than when normal control is performed.

10. The fail-safe control device described in claim 9, wherein the control unit further performs a control for suppressing the occurrence of smoke by reducing or stopping an EGR rate.

11. A fail-safe control device for an internal combustion engine, comprising:

a throttle valve;

a diagnostic for determining a position of the throttle valve; and a control unit for controlling a throttle aperture when the throttle valve is stuck in a fixed position, the control unit performing a fuel injection control for suppressing an occurrence of smoke that includes a reserve fuel injection and a main fuel injection during a combustion cycle so that a reserve fuel injection timing is advanced and a main fuel injection timing is delayed as compared to when normal control is performed.

12. A fail-safe control device for an internal combustion engine, comprising:

a throttle valve;

a diagnostic for determining a position of the throttle valve;

a control unit for controlling a throttle aperture when the throttle valve is stuck in a fixed position; and a control unit for suppressing an occurrence of smoke by dividing the injection into reserve fuel injection and main fuel injection so that a volume of reserve fuel injection is reduced or eliminated as compared to during normal control.

13. A fail-safe control device for an internal combustion engine, comprising:

a throttle valve;

a diagnostic for determining a position of the throttle valve; and a control unit for controlling a throttle valve aperture when the throttle valve is stuck in a fixed position, the control unit being configured to be operatively coupled to an exhaust micron particle collecting device in an exhaust system that performs regeneration control while closing the throttle valve aperture and raising an exhaust temperature to eliminate exhaust micron particles collected in the exhaust micron particle collecting device, and the control unit being further configured to switch from the regeneration control to a fail safe control when the throttle valve is diagnosed as being stuck.

* * * * *